United States Patent [19]

Foley

[11] Patent Number: 4,745,591
[45] Date of Patent: May 17, 1988

[54] MULTIPLE CHANNEL WAVELENGTH DIVISION MULTIPLEXER/DEMULTIPLEXER

[75] Inventor: Barbara M. Foley, Watertown, Mass.

[73] Assignee: GTE Laboratories Incorporated, Waltham, Mass.

[21] Appl. No.: 18,232

[22] Filed: Feb. 24, 1987

[51] Int. Cl.$^4$ .......................... H04B 9/00; G02B 5/30
[52] U.S. Cl. .......................................... 370/3; 370/2; 455/616; 350/401
[58] Field of Search ....................... 455/616; 370/2, 3; 350/400, 401

[56] References Cited

U.S. PATENT DOCUMENTS 4,566,761 1/1986 Carlsen et al. .......................... 370/2
4,685,773 8/1987 Carlsen et al. ...................... 350/401

Primary Examiner—Benedict V. Safourek
Assistant Examiner—Andrew J. Telesz, Jr.
Attorney, Agent, or Firm—Fred Fisher

[57] ABSTRACT

A sequential configuration of $\log_2 n$ stages of birefringent elements are set forth. Each stage has a transfer function approximating a square wave, and successive stages have half periods. An input beam with n wavelength components would be demultiplexed into 2, 4 and finally n output beams at the output of the first, second, and $\log_2 n$ stages, each output beam containing only one wavelength. Successive stages consist of two polarizing beam splitters between which is located their appropriate length of birefringent element to achieve the desired transfer function.

6 Claims, 4 Drawing Sheets

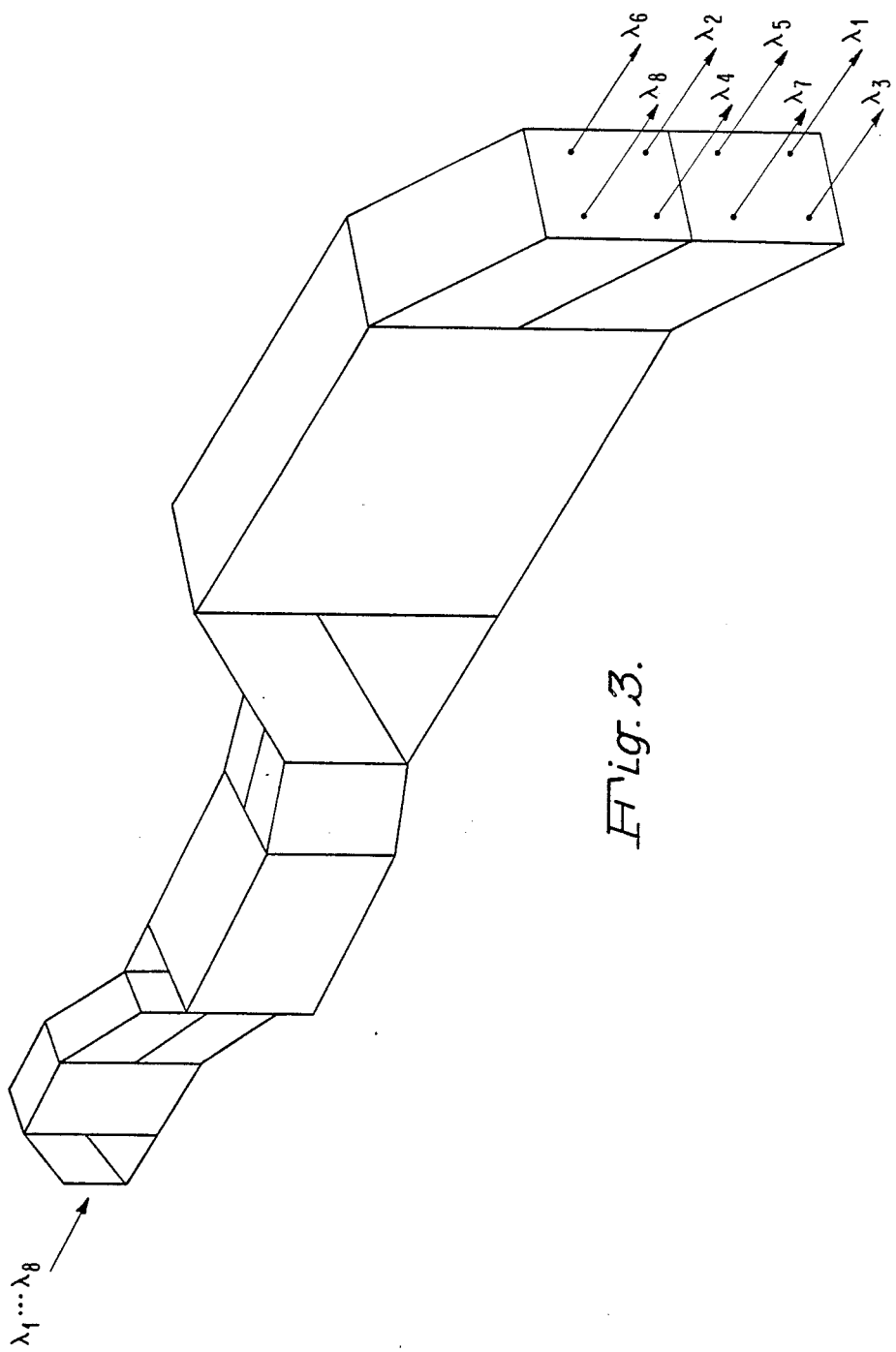

MULTIPLE CHANNEL WAVELENGTH DIVISION MULTIPLEXER/DEMULTIPLEXER

RELATED APPLICATION

This invention is related to a pending U.S. patent application Ser. No. 791,820, entitled "Birefringent Optical Multiplexer With Flattened Bandpass", by W. John Carlsen and Paul Melman, filed Oct. 22, 1985, now U.S. Pat. No. 4,685,773, issued Aug. 11, 1987. That pending application is a continuation-in-part application of Ser. No. 650,012, filed Sept. 13, 1984, now U.S. Pat. No. 4,566,761, issued Jan. 28, 1986.

BACKGROUND OF THE INVENTION

1. Field of the Invention

This invention relates to a multiple channel (greater than two channels) birefringent multiplexer/demultiplexer. Accordingly, it is a general object of this invention to provide new and improved multiplexers and demultiplexers of such character.

2. General Background

U.S. Pat. No. 4,566,761 and the aforesaid pending application for "Birefringent Optical Multiplexer With Flattened Bandpass" present the advantages of birefringent wavelength division multiplexing (WDM) over previously used methods of wavelength division multiplexing, including dichroic mirrors, gratings, and holographic gratings methods. The problems inherent in multiple channel multiplexing/demultiplexing with a nonbirefringent WDM were stated in the cited U.S. Pat. No. 4,566,761.

The foregoing citations further describe a method of multiple channel multiplexing/demultiplexing with the birefringent WDM using a tree structure of filter stages. The four channel multiplexer/demultiplexer used three filter stages, A, B, C, where stage A had a channel separation of $\Delta\lambda$ and stages B and C had channel separations of $2\Delta\lambda$. The B and C stages were also required to be of lengths which were not equal but differed by $d1 = \lambda/(4\Delta n)$, where $\Delta n$ is the birefringence of the crystal. Successive branches would require that the stages in the parallel branch all be of different lengths to an accuracy of 2 $\mu$m. This stringent requirement would make for costly difficult production.

SUMMARY OF THE INVENTION

Another object of this invention is to provide for a new and improved multiple channel wavelength division multiplexer/demultiplexer which simplifies the tolerances on the crystal lengths for successive filter stages where a filter stage is one complete two channel multiplexer.

Still another object of this invention is to provide for a new and improved multiple channel wavelength division multiplexer/demultiplexer which avoids the use of a tree structure array by uniting the parallel branches of the tree structure into one filter stage, thereby reducing the number of stages from $(n-1)$ to $\log_2 n$ where n is the number of channels being multiplexed or demultiplexed.

It is yet another object of this invention to provide for a new and improved multiple channel wavelength division multiplexer/demultiplexer in which the stringent requirement of making precisely differing stages for the parallel branches is removed since the beams from the channels being combined or separated (multiplexed/demultiplexed) are propagating through the same filter stage.

In accordance with this invention, a sequential configuration of only $\log_2 n$ stages is possible. For the demultiplexer, each stage has a transfer function approximating a square wave and each successive stage has a halved period of the preceding stage. In the case of the multiplexer, each successive stage has a period doubled that of the preceding stage. An input beam composed of n distinct wavelengths is demultiplexed into n output beams, each containing only one wavelength. Each stage consists of two polarizing beam splitters between which are located an appropriate number of birefringent crystal elements to achieve the desired transfer function.

In accordance with one aspect of the invention, a multiple channel birefringent demultiplexing apparatus includes $\log_2 n$ stages, serially coupled together, where n represents a number of optical wavelengths capable of being demultiplexed, and $\log_2 n$ is an integer greater than 1. Each of the stages include an input polarizing beam splitting means, a length of birefringent material, and an output polarizing beam splitting means. The input polarizing beam splitting means converts an input beam of collimated light whose polarization state is immaterial into two orthogonally polarized output beams which are parallel to each other. The length of birefringent material has an input face and an output face, the faces being parallel for receiving the output beams normally applied to the input face. The material has a length and transfer function such that certain wavelengths pass therethrough with their polarization unchanged, and that remaining wavelengths have their polarization rotated by 90° at the output face. The output polarizing beam splitter means is coupled to the output face for receiving beams of polarized light therefrom and for converting same to collimated demultiplexed beams of light whose polarizations are immaterial. The input polarizing beam splitting means of the subsequent one of the stages is coupled to the output polarizing beamsplitter means of the immediately preceding one of the stages. According to certain features of the invention, n can be equal to 8, and $\log_2 n$ can be equal to 3.

In accordance with the more specific feature of the invention, a collimated beam of light having wavelengths of $\lambda_1, \lambda_2, \lambda_3, \lambda_4, \lambda_5, \lambda_6, \lambda_7, \lambda_8$ can be applied to the input beam splitting means of a first of the stages. The wavelengths are adjacent to each other and are equally spaced with $\lambda_1$ being lower than $\lambda_8$ to produce at the input face of the birefringent material of the first stage one beam of parallel polarized light containing the wavelengths $\lambda_1, \lambda_2, \lambda_3, \lambda_4, \lambda_5, \lambda_6, \lambda_7, \lambda_8$ and one beam of perpendicular polarized light containing those wavelengths $\lambda_1, \lambda_2, \lambda_3, \lambda_4, \lambda_5, \lambda_6, \lambda_7, \lambda_8$. Both of the one beams are spaced apart and parallel to each other. They are applied to the input face of birefringent material of the first stage. The one beams traverse the length of the birefringent material of the first stage to yield a first pair of transferred beams. One of the transferred beams contains parallel polarized light at the wavelengths $\lambda_1, \lambda_2, \lambda_3, \lambda_4$ and perpendicular polarized light at the wavelengths $\lambda_5, \lambda_6, \lambda_7, \lambda_8$. The other of the transferred beams contain perpendicular polarized light at the wavelengths of $\lambda_1, \lambda_2, \lambda_3, \lambda_4$ and parallel polarized light at the wavelengths $\lambda_5, \lambda_6, \lambda_7, \lambda_8$, both of the first pair of transferred beams being applied to the output polarizing beam splitting means of the first stage whereby the output polarizing beam splitting means of the first stage yields a first beam containing wavelengths $\lambda_5$, $\lambda_6$, $\lambda_7$, $\lambda_8$ and a second beam containing wavelengths $\lambda_1$, $\lambda_2$, $\lambda_3$, $\lambda_4$. The first beam and the second beam are directed to the input beam splitting means of a second of the stages to produce four parallel beams of polarized light at the input face of the birefringent material of the second stage. A first of the four parallel beams contain parallel polarized light having wavelengths at $\lambda_5$, $\lambda_6$, $\lambda_7$, $\lambda_8$, a second of the four parallel beams contain perpendicular polarized light having wavelengths at $\lambda_5$, $\lambda_6$, $\lambda_7$, $\lambda_8$, a third of the parallel beams contain parallel polarized light having wavelengths at $\lambda_1$, $\lambda_2$, $\lambda_3$, $\lambda_4$, and a fourth of said four parallel beams contain perpendicular polarized light having wavelengths at $\lambda_1$, $\lambda_2$, $\lambda_3$, $\lambda_4$, all of said four beams being spaced apart in multiple planes parallel to each other, being applied to the input face of the birefringent material of the second stage. The four parallel beams traverse the length of the birefringent material of the second stage to yield a quartet of transformed beams. One of the transformed beams contains parallel polarized light at wavelengths $\lambda_5$, $\lambda_6$ and perpendicular polarized light at wavelengths $\lambda_7$, $\lambda_8$. A second of the transformed beams contains perpendicular polarized light at wavelengths $\lambda_5$, $\lambda_6$ and parallel polarized light at wavelengths $\lambda_7$, $\lambda_8$. A third of the transformed beams contains parallel polarized light at wavelengths $\lambda_1$, $\lambda_2$ and perpendicular polarized light at wavelengths $\lambda_3$, $\lambda_4$. A fourth of the transformed beams contain perpendicular polarized light at wavelengths $\lambda_1$, $\lambda_2$, and parallel polarized light at wavelengths $\lambda_3$, $\lambda_4$. All four transformed beams are applied to the output polarized beam splitter means of the second stage. The output polarizing beam splitter means of the second stage yields a first intermediary beam containing wavelengths $\lambda_7$, $\lambda_8$. A second intermediary beam contains wavelengths $\lambda_5$, $\lambda_6$. A third intermediary beam contains wavelengths $\lambda_3$, $\lambda_4$. A fourth intermediary beam contains wavelengths of $\lambda_1$, $\lambda_2$. The four intermediary beams are directed to the input beam splitting means of a third of the stages to produce at the input face of the birefringent material of the third stage, eight parallel beams of polarized light. A first of the eight parallel beams contains parallel polarized light having wavelengths of $\lambda_7$, $\lambda_8$. A second of the eight parallel beams contains parallel polarized light having wavelengths of $\lambda_5$, $\lambda_6$. A third of the eight parallel beams contains parallel polarized light having wavelengths of $\lambda_3$, $\lambda_4$. A fourth of the eight parallel beams contains parallel polarized light having wavelengths of $\lambda_1$, $\lambda_2$. A fifth of the eight parallel beams contains perpendicular polarized light having wavelengths of $\lambda_7$, $\lambda_8$. A sixth of the eight parallel beams contains perpendicular polarized light having wavelengths of $\lambda_5$, $\lambda_6$. A seventh of the eight parallel beams contains perpendicular polarized light having wavelengths of $\lambda_3$, $\lambda_4$, and an eighth of the eight parallel beams contains perpendicular polarized light having wavelengths of $\lambda_1$, $\lambda_2$. All said eight parallel beams are spaced apart parallel to each other which are applied to the input face of the birefringent material of the third stage. The eight parallel beams travel the length of the birefringent material of the third stage to yield an octet of converted beams. One of the converted beams contains parallel polarized light of wavelength $\lambda_7$, and perpendicular polarized light at wavelength $\lambda_8$. A second of the converted beams contains parallel polarized light at wavelength $\lambda_5$, and perpendicular light at wavelength $\lambda_6$. A third of the converted beams contains parallel polarized light at wavelength $\lambda_3$, and perpendicular polarized light at wavelength $\lambda_4$. A fourth of the converted beams contains parallel polarized light at wavelength $\lambda_1$, and perpendicular parallel light at wavelength $\lambda_2$. A fifth of the converted beams contains perpendicular polarized light at wavelength $\lambda_7$, and parallel polarized light at wavelength $\lambda_8$. A sixth of the converted beams contains perpendicular polarized light at wavelength $\lambda_5$, and parallel polarized light at wavelength $\lambda_6$. A seventh of the converted beams contains perpendicular polarized light at wavelength $\lambda_3$, and parallel polarized light at wavelength $\lambda_4$. An eighth of the converted beams contains perpendicular polarized light at wavelength $\lambda_1$, and parallel polarized light at wavelength $\lambda_2$. All eight converted beams are applied to the output polarizing beam splitting means of the third stage whereby the output polarizing beam splitting means of the first stage yields a first demultiplexed beam at wavelength $\lambda_8$, a second demultiplexed beam at wavelength $\lambda_6$, a third demultiplexed beam at wavelength $\lambda_4$, a fourth demultiplexed beam at wavelength $\lambda_2$, a fifth demultiplexed beam at wavelength $\lambda_7$, a sixth demultiplexed beam at wavelength $\lambda_5$, a seventh demultiplexed beam at wavelength $\lambda_3$, and an eighth demultiplexed beam at wavelength $\lambda_1$.

In accordance with another aspect of the invention, a multiple channel birefringent demultiplexing apparatus includes $\log_2 n$ stages serially coupled together, wherein n represents the number of optical wavelengths capable of being multiplexed and $\log_2 n$ is an integer greater than one. Each of the stages includes an input polarizing beam splitting means, a length of birefringent material, and an output polarizing beam splitting means. An input polarizing beam splitting means receives at least one input beam of collimated light whose polarization state is immaterial, and converts them into twice as many orthogonally polarized output beams. The input and output beams are parallel to each other. The length of birefringent material has an input face and an output face. The faces are parallel for receiving output beams normally applied to the input face. The material has a length and transfer function such that certain wavelengths pass therethrough with their polarization unchanged and that remaining wavelengths have their polarization rotated by 90°. The output polarizing beam splitting means coupled to the output face receives $2^X$ beams of polarized light therefrom and converts same to $2^X$ collimated multiplexed beams of light whose polarization is immaterial, wherein X is a positive integer. The input polarizing beam splitting means of a subsequent one of the stages is coupled to the output polarizing beam splitter of the immediately preceding one of the stages. With some features of the invention, for the first stage, certain wavelengths are alternate; for the second stage, certain is adjacent pairs of alternate wavelengths; and for the $\log_2 n$ stage, certain wavelengths are lower wavelengths.

In accordance with specific features of the invention, n is equal to 8, and $\log_2 n$ is equal to 3.

BRIEF DESCRIPTION OF THE DRAWINGS

Other objects, advantages, and features of this invention, together with its construction and mode of operation, will become more apparent from the following description, when read in conjunction with accompanying drawings, in which:

FIG. 3 is a perspective view of an embodiment of this invention;

DETAILED DESCRIPTION

Figure 1:
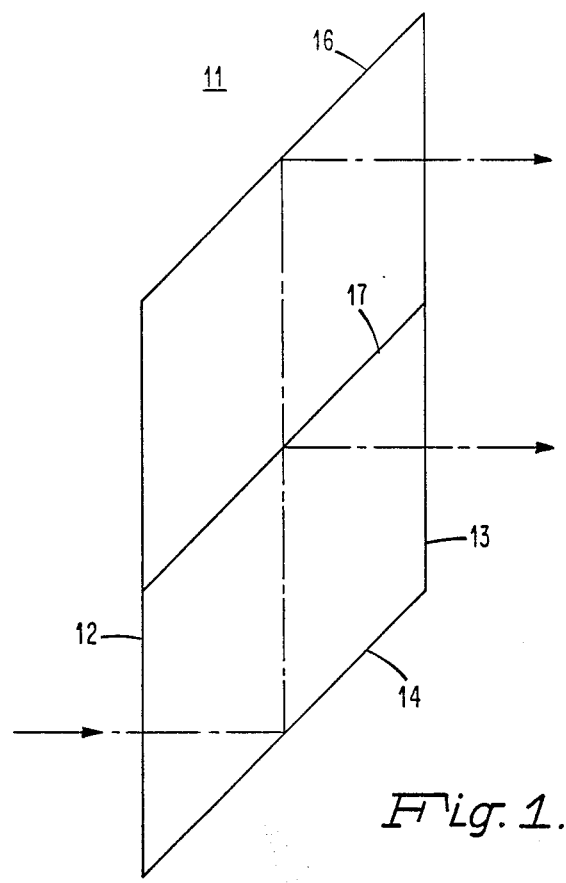
FIG. 1 is a diagram of a polarization beam splitter useful in the practice of this invention.
Figure 2A:
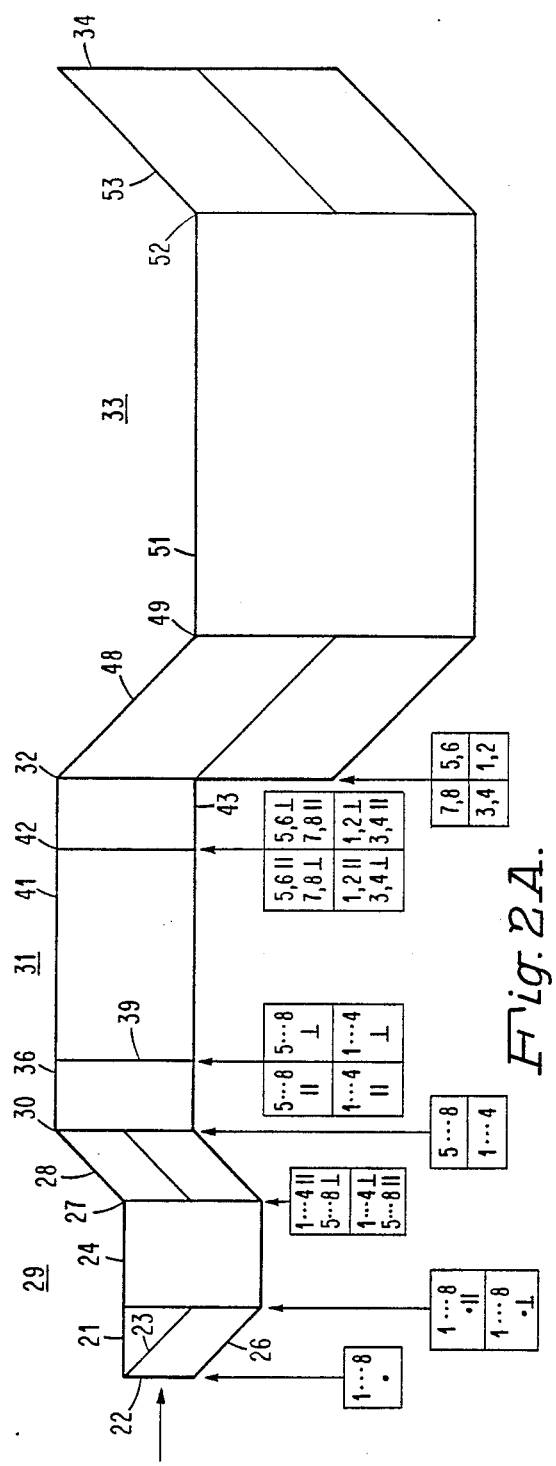
FIGS. 2A and 2B are side and top views, respectively, of one embodiment of this invention.
Figure 2B:
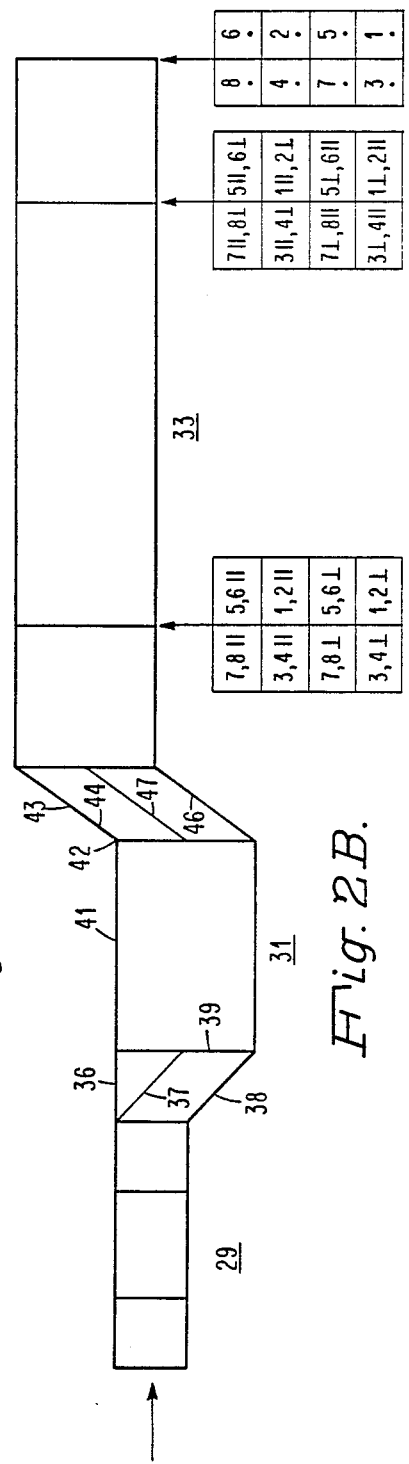

The multichannel wavelength division multiplexer/demultiplexer as taught in this specification utilizes a polarizing beam splitter 11 having an input face 12 that is parallel with an output face 13. A first internal reflective surface 14 is likewise parallel to a second internal reflecting surface 16. A polarizing beam splitting element 17 is so oriented within the beam splitter 11 to be parallel with the reflecting surfaces 14, 16. Thus, though the beam splitter 11 may not be perfectly oriented in the position as shown, due to various inaccuracies that may be present, the output beams therefrom will always be parallel to each other. FIGS. 2A and 2B depict side and top view, respectively, of a three stage n-channel demultiplexer. An input collimated beam containing a plurality of wavelengths to be demultiplexed is depicted by the horizontal arrows shown at the left of the drawing, directed to the beam splitter 21 at its input face 22. The beam is directed to the beam splitter layer 23 causing parallel polarized light at the wavelengths supplied thereto, for example, wavelengths $\lambda_1, \lambda_2, \lambda_3, \lambda_4, \lambda_5, \lambda_6, \lambda_7, \lambda_8$ to pass directly therethrough to the first birefringent element 24.

The beam splitting layer 23 reflects perpendicularly polarized light at the wavelengths $\lambda_1$ through $\lambda_8$ down to the internal reflecting surface 26 of the first polarizing beam splitter 21 causing the perpendicularly polarized beams of light at the wavelengths $\lambda_1, \ldots \lambda_8$ to pass through the first birefringent element 24 at the lower portion of FIG. 2A.

The upper beam of light through the first birefringent element 24 containing parallel polarized light at the wavelengths $\lambda_1$ through $\lambda_8$ is so transformed to provide a beam of light that contains parallel polarized light at the wavelengths $\lambda_1$ through $\lambda_4$ and perpendicular polarized light at wavelengths $\lambda_5$ through $\lambda_8$. In converse fashion, the lower beam of light containing the perpendicular polarized beams at wavelengths $\lambda_1$ through $\lambda_8$ pass therethrough and are transformed to provide a beam containing perpendicular polarized light at the wavelengths $\lambda_1$ through $\lambda_4$ and parallel polarized light at wavelengths $\lambda_5$ through $\lambda_8$ as indicated at the interface 27 between the first birefringent element 24 and the output beam splitting means 28 of the first stage 29.

Figure 5:
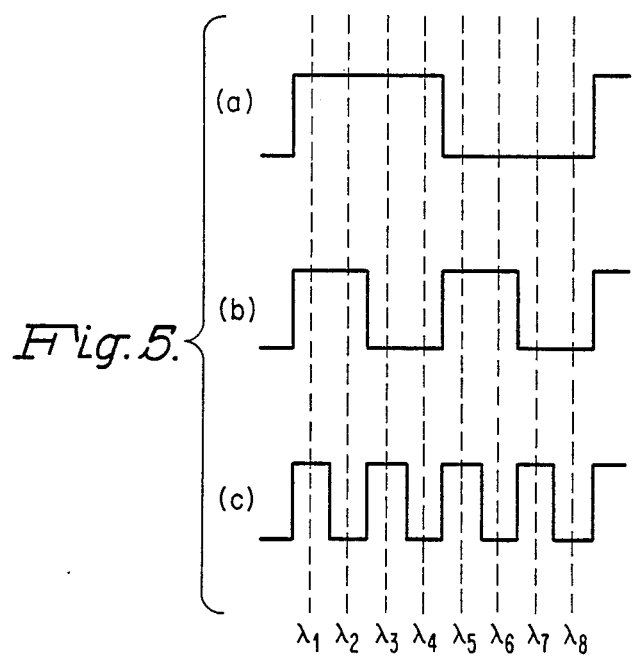
FIG. 5 is a set of transfer functions for three elements for multiplexing or demultiplexing eight wavelengths.

FIG. 5, waveform (a), illustrates the transform waveform for the various wavelengths $\lambda_1$ through $\lambda_8$. As indicated, the lower wavelengths $\lambda_1$ through $\lambda_4$ do not have their polarization changed, while the upper wavelength $\lambda_5$ through $\lambda_8$ do have their polarization changed.

The beam containing the parallel polarized light at the wavelengths $\lambda_1$ through $\lambda_4$ and the perpendicular polarized light containing the wavelengths $\lambda_5$ through $\lambda_8$ together with the beam containing the perpendicular polarized light of wavelengths $\lambda_1$ through $\lambda_4$ and the parallel polarized light containing wavelengths $\lambda_5$ through $\lambda_8$ are both applied to the output beam splitter 28 of the first stage 29 whereby the two beams exit in a combined manner so that one beam emerges containing wavelengths $\lambda_5$ through $\lambda_8$ whose polarization state is immaterial and the other beam emerges containing wavelengths $\lambda_1$ through $\lambda_4$ whose polarization state is immaterial.

Thus, as to the first stage 29, a beam applied at its input facet 22 containing wavelengths $\lambda_1$ through $\lambda_8$ yields at its output interface 30 two beams, one beam containing wavelengths $\lambda_5$ through $\lambda_8$ and the other beam containing wavelengths $\lambda_1$ through $\lambda_4$.

The second stage 31 has two beams applied thereto at the interface 30. One beam contains wavelengths $\lambda_5$ through $\lambda_8$ and the other beam contains wavelengths $\lambda_1$ through $\lambda_4$, yielding at its output interface 32 four sets of beams, one beam containing wavelengths $\lambda_7$ and $\lambda_8$, another beam containing wavelengths $\lambda_5$ and $\lambda_6$, a third beam containing wavelengths $\lambda_3$ and $\lambda_4$, and a fourth beam containing wavelengths $\lambda_1$ and $\lambda_2$.

In a similar fashion, the third stage 33 having four beams of collimated light at immaterial polarization states, one beam containing wavelengths $\lambda_7, \lambda_8$, another beam at wavelengths $\lambda_5, \lambda_6$, a third beam at wavelengths $\lambda_3, \lambda_4$, and a fourth beam of wavelengths $\lambda_1, \lambda_2$, provides at its output facet 34 eight beams of light of different wavelengths, specifically wavelengths $\lambda_8, \lambda_6, \lambda_4, \lambda_2, \lambda_7, \lambda_5, \lambda_3$, and $\lambda_1$.

As depicted in FIG. 2A, the input beam applied to the facet 22 of the stage 29, containing light of no particular polarization at wavelengths $\lambda_1$ through $\lambda_8$, provides two output beams, one at wavelengths $\lambda_5$ through $\lambda_8$, and the other at wavelengths $\lambda_1$ through $\lambda_4$ at the interface 30. The input beam and the output beams are applied along a common plane.

The two beams, one carrying the wavelengths $\lambda_5$ through $\lambda_8$, and the other carrying the wavelengths $\lambda_1$ through $\lambda_4$, are applied to the second stage 31 to the interface 30 of an input beam splitter 36 of the second stage 31. The beam splitter 36 is rotated 90° with respect to the corresponding beam splitter 21 of the first stage 29 as will be more apparent from a view of the devices shown in FIG. 2B.

The two beams (the upper beam containing the unpolarized light having wavelengths $\lambda_5$ through $\lambda_8$ and the lower beam containing unpolarized light containing wavelengths $\lambda_1$ through $\lambda_4$) are applied to the interface 30 of the input polarizing beam splitter 36 of the second stage 31. The light need not be unpolarized, the polarization state is immaterial. The aforesaid two beams are passed through the input polarization beam splitter 37 (FIG. 2B), some of the light passing directly through the beam splitting layer 37, while the remaining light is reflected by the beam splitter layer 37 to the internally reflected surface 38 of the beam splitter means 36, causing four beams to pass therethrough. The beam of light which contains the the wavelengths $\lambda_5$ through $\lambda_8$ is transformed into two beams, one of which contains parallel polarized light at the wavelengths $\lambda_5$ through $\lambda_8$ and a second beam containing perpendicular polarized light at the wavelengths $\lambda_5$ and $\lambda_8$. The beam of unpolarized light at wavelengths $\lambda_1$ through $\lambda_4$ are converted into two other beams, one beam of which contains parallel polarized light at wavelengths $\lambda_1$ through $\lambda_4$ and the other beam containing perpendicular polarized light at wavelengths $\lambda_1$ through $\lambda_4$. Those four beams, the parallel polarized light at wavelengths $\lambda_5$ through $\lambda_8$, the perpendicular polarized light at wavelengths $\lambda_5$ through $\lambda_8$, the parallel polarized light at wavelengths $\lambda_1$ through $\lambda_4$, and the perpendicular polarized light at wavelengths $\lambda_1$ through $\lambda_4$ appear at the interface 39 of the input beam splitter 36 and a second birefringent element 41 of the second stage 31.

Four beams are applied to the input interface 39 of the second birefringent element 41 of the second stage 31. Those four beams are: a parallel polarized beam of light at wavelengths $\lambda_5$ through $\lambda_8$, a perpendicular polarized beam of light at wavelengths $\lambda_5$ through $\lambda_8$, a parallel polarized beam of light at wavelengths $\lambda_1$ through $\lambda_4$, and a perpendicular polarized beam of light at wavelengths $\lambda_1$ through $\lambda_4$.

The second birefringent element 41 has a transfer function as depicted at waveform (b) at FIG. 5 and has a length such that the output of the birefringent element 41 (at its interface 42 with its output beam splitter means 43) provides four transferred beams. One of the transferred beams contains parallel polarized light at wavelengths $\lambda_5$ and $\lambda_6$ and perpendicular polarized light at wavelengths $\lambda_7$ and $\lambda_8$. A second of the transferred beams contains perpendicular polarized light at wavelengths $\lambda_5$ and $\lambda_6$ and parallel polarized light at wavelengths $\lambda_7$ and $\lambda_8$. A third beam contains parallel polarized light at wavelengths $\lambda_1$ and $\lambda_2$ and perpendicular polarized light at wavelengths $\lambda_3$ and $\lambda_4$. A fourth beam of light contains perpendicular polarized light at wavelengths $\lambda_1$ and $\lambda_2$ and parallel polarized light at wavelengths $\lambda_3$ and $\lambda_4$, as viewed in FIG. 2A.

The foregoing four beams of light at the interface 42 are directed to the output beam splitter 43 of the second stage 31. The internal reflecting surfaces 44, 46 and the beam splitter layers 47 (all of which are parallel to each other) so act upon the four beams having their designated wavelengths and polarization states to provide at the interface 32 (between the two stages 31 and 33) four beams of light whose polarization state is immaterial. One of those beams of light contains wavelengths at $\lambda_7$ and $\lambda_8$, a second beam containing light at wavelengths $\lambda_5$ and $\lambda_6$, a third beam containing light at wavelengths $\lambda_3$ and $\lambda_4$, and a fourth beam of light containing light at wavelengths $\lambda_1$ and $\lambda_2$.

Those four beams of light at the interface 32 are directed to an input beam splitter means 48 of the third stage 33 at an angle preferably rotated 90° as indicated in FIG. 2. The rotation of 90° may be in the same or in the opposite direction as that between stages 1 and 2, it being immaterial whether a clockwise and a counterclockwise direction is used. Further, it is deemed immaterial that the angle of rotation be precisely 90°. The specific angles ar not deemed to be critical.

Four beams are applied to the interface 32 of the stage 33. Those four beams are: one at wavelengths $\lambda_7$, $\lambda_8$, a second at wavelengths $\lambda_5$, $\lambda_6$, a third at wavelengths $\lambda_3$, $\lambda_4$, and a fourth at wavelength $\lambda_1$, $\lambda_2$. The polarization beam splitter 48 splits those four beams to yield eight beams at the interface 49 (between the input beam splitter 48 and the third birefringent element 51 of the first stage 33). Eight beams: the first of the eight beams contains parallel polarized light at wavelengths $\lambda_7$, $\lambda_8$. A second of those beams contains parallel polarized light at wavelengths $\lambda_5$, $\lambda_6$. A third beam contains parallel polarized light at wavelengths $\lambda_3$, $\lambda_4$. A fourth beam contains parallel polarized light at wavelengths $\lambda_1$, $\lambda_2$. A fifth beam contains perpendicular polarized light at wavelengths $\lambda_7$, $\lambda_8$. A sixth beam contains perpendicular polarized light at wavelengths $\lambda_5$, $\lambda_6$. A seventh beam contains perpendicular polarized light at wavelengths $\lambda_3$, $\lambda_4$. An eighth beam contains perpendicular polarized light at wavelengths $\lambda_1$, $\lambda_2$.

The length of the third birefringent element 51 at the third stage 33, results in a transform waveform (as depicted in waveform (c) at FIG. 5), which transforms those eight beams at the input interface 49 of the third birefringent element 51 into eight transformed beams at the interface 52 between the birefringent element 51 and the output beam splitter 53 of the third stage 33. Those transformed beams are such that the first beam contains parallel polarized light at wavelength $\lambda_7$ and perpendicular polarized light at wavelength $\lambda_8$. A second beam contains parallel polarized light at wavelength $\lambda_5$ and perpendicular polarized light at wavelength $\lambda_6$. A third beam contains parallel polarized light at wavelength $\lambda_3$ and perpendicular polarized light at wavelength $\lambda_4$. A fourth beam contains parallel polarized light at wavelength $\lambda_1$ and perpendicular polarized light at wavelength $\lambda_2$. A fifth beam contains perpendicular polarized light at wavelength $\lambda_7$ and parallel polarized light at wavelength $\lambda_8$. A sixth beam contains parallel polarized light at wavelength $\lambda_6$ and perpendicular polarized light at wavelength $\lambda_5$. A seventh beam contains perpendicular polarized light at wavelength $\lambda_3$ and parallel polarized light at wavelength $\lambda_4$. An eighth beam contains perpendicular polarized light at wavelength $\lambda_1$ and parallel polarized light at wavelength $\lambda_2$.

The aforesaid latter eight beams of various wavelengths and polarizations at the interface 52 are applied to the output beam splitting means 53 of the third stage 33 so that at its output facet 34 eight beams of immaterial polarization are provided: namely, beams at wavelength $\lambda_8$, a beam at wavelength $\lambda_6$, a beam at wavelength $\lambda_4$, a beam at wavelength $\lambda_2$, a beam at wavelength $\lambda_7$, a beam at wavelength $\lambda_5$, a beam at wavelength $\lambda_3$, and a beam at wavelength $\lambda_1$.

FIG. 3 depicts a perspective view somewhat based upon the views depicted in FIGS. 2A and 2B, with the exception that different beam splitter means are illustrated. The specific type of beam splitting means is not critical due to the overall basic concept of this invention.

Figure 4:
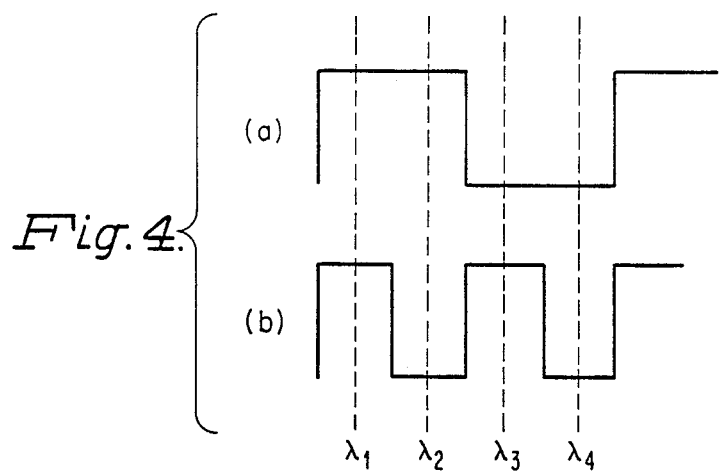
FIG. 4 illustrates transfer functions for two elements, the waveform FIG. 4A representing the transfer function for the birefringent element closer to the beam to be demultiplexed, whereas the transfer function shown at FIG. 4B is for the birefringent element closer to the demultiplexed beams.

FIG. 5, as previously described hereinabove, refers to a three stage system wherein the first birefringent stage has a transfer function as indicated in waveform (a) of FIG. 5, the second stage has a transfer function as indicated in waveform (b) of FIG. 5, while the third birefringent stage has the transfer function indicated in waveform (c) of FIG. 5. However, it shall be apparent that as depicted in FIG. 4 for a device that utilizes merely two birefringent stages utilizing four wavelengths instead of eight, waveform (a) of FIG. 4 would indicate the transfer function of the first birefringent element while waveform (b) would indicate the transfer function for the second birefringent element.

The second stage has birefringent crystal elements which are twice the length of the crystals in the first stage using a transfer function in phase with and having half the period of the transfer function of the first stage. The crystals in the second stage have increased lateral dimensions. The second stage is rotated, counter clockwise or clockwise (it does not matter), with respect to the first stage so that the parallel beams of the output port of the first stage enter the polarizing beam splitter of the second stage at different heights.

When n different wavelengths in one beam are inputted to the first stage with $\lambda_1 > \lambda_2 > \lambda_3 \ldots > \lambda_n$, where n can be 4, 8, 16, ... $2^y$ where y is an integer, then $\lambda_1$ ... $\lambda_{n/2}$ are in one output beam of stage one and $\lambda_{(n/2+1)}$ ... $\lambda_n$ are in the other output beam of stage one. These two separate beams are inputted into the second stage and each beam propagates through the second stage so that, at the output thereof, there are four separate beams with one beam containing the first n/4 wavelengths, the second beam containing the next n/4 wavelengths, etc.

The third stage is rotated at 90° (clockwise or counter clockwise, it is immaterial) with respect to the second stage so that the four separate beams traveling in a parallel direction are all incident on the input polarizing beam splitter of the third stage. At the output there are eight separate beams, one beam contained in the first n/8 wavelengths, the second beam contained in the next n/8 wavelengths, and the like.

This pattern of individual filter stages of increasing dimension, each rotated by 90° from the previous filter stage continues through $\log_2 n$ filter stages when all n wavelengths are separated into n beams. The n-channel multiplexer is constructed in exactly the same manner except that the beams are propagated in the opposite direction.

Various modifications can be performed without departing from the spirit and scope of this invention.

What is claimed is:

1. Multiple channel birefringent demultiplexing apparatus comprising
    $\log_2 n$ stages serially coupled together, wherein n represents the number of optical wavelengths capable of being demultiplexed and $\log_2 n$ is an integer greater than one, each of said stages comprising
    an input polarizing beam splitting means for converting an input beam of collimated light whose polarization state is immaterial into two orthogonally polarized output beams, said input and output beams being parallel to each other,
    a length of birefringent material having an input face and an output face, said faces being parallel, for receiving said output beams normally applied to said input face, said material having a length and transfer function such that certain wavelengths pass therethrough with their polarization unchanged and that remaining wavelengths have their polarization rotated by 90° and
    an output polarizing beam splitter means coupled to said output face for receiving beams of polarized light therefrom and for converting same to collimated demultiplexed beams of light whose polarization is immaterial,
    and wherein said input polarizing beam splitting means of a subsequent one of said stages is coupled to said output polarizing beam splitter means of the immediately preceding one of said stages.

2. The demultiplexing apparatus as recited in claim 1 wherein n is equal to 8, and $\log_2 n$ is equal to 3.

3. The demultiplexing apparatus as recited in claim 2 wherein
    a collimated beam of light having wavelengths $\lambda_1$, $\lambda_2$, $\lambda_3$, $\lambda_4$, $\lambda_5$, $\lambda_6$, $\lambda_7$, $\lambda_8$ can be applied to said input beam splitting means of a first of said stages, said wavelengths being adjacent to each other and equally spaced with $\lambda_1$ being lower than $\lambda_8$, to produce, at said input face of said birefringent material of said first stage,
    one beam of parallel polarized light containing said wavelengths $\lambda_1$, $\lambda_2$, $\lambda_3$, $\lambda_4$, $\lambda_5$, $\lambda_6$, $\lambda_7$, $\lambda_8$ and one beam of perpendicular polarized light containing said wavelengths $\lambda_1$, $\lambda_2$, $\lambda_3$, $\lambda_4$, $\lambda_5$, $\lambda_6$, $\lambda_7$, $\lambda_8$, both said one beam being spaced apart and parallel to each other, being applied to said input face of said birefringent material of said first stage, said one beams traversing said length of said birefringent material of said first stage to yield a first pair of transferred beams, one of said transferred beams containing parallel polarized light at said wavelengths $\lambda_1$, $\lambda_2$, $\lambda_3$, $\lambda_4$ and perpendicular polarized light at said wavelengths $\lambda_5$, $\lambda_6$, $\lambda_7$, $\lambda_8$, the other of said transferred beams containing perpendicular polarized light at said wavelength $\lambda_1$, $\lambda_2$, $\lambda_3$, $\lambda_4$ and parallel polarized light at said wavelengths $\lambda_5$, $\lambda_6$, $\lambda_7$, $\lambda_8$, both of said first pair of transferred beams being applied to said output polarizing beam splitter means of said first stage, whereby said output polarizing beam splitter means of said first stage yields a first beam containing wavelengths $\lambda_5$, $\lambda_6$, $\lambda_7$, $\lambda_8$ and a second beam containing wavelengths $\lambda_1$, $\lambda_2$, $\lambda_3$, $\lambda_4$, said first beam and said second beam being directed to said input beam splitting means of a second of said stages, to produce, at said input face of said birefringent material of said second stage,
    four parallel beams of polarized light, a first of said four parallel beams containing parallel polarized light having wavelengths at $\lambda_5$, $\lambda_6$, $\lambda_7$, $\lambda_8$, a second of said four parallel beams containing perpendicular polarized light having wavelengths at $\lambda_5$, $\lambda_6$, $\lambda_7$, $\lambda_8$, a third of said four parallel beams containing parallel polarized light having wavelengths at $\lambda_1$, $\lambda_2$, $\lambda_3$, $\lambda_4$, and a fourth of said four parallel beams containing perpendicular polarized light having wavelengths at $\lambda_1$, $\lambda_2$, $\lambda_3$, $\lambda_4$, all of said four beams being spaced apart in multiple planes parallel to each other, being applied to said input face of said birefringent material of said second stage, said four parallel beams traversing said length of said birefringent material of said second stage to yield a quartet of transformed beams, one of said transformed beams containing parallel polarized light at wavelengths $\lambda_5$, $\lambda_6$ and perpendicular polarized light at wavelengths $\lambda_7$, $\lambda_8$, a second of said transformed beams containing perpendicular polarized light at wavelength $\lambda_5$, $\lambda_6$ and parallel polarized light at wavelengths $\lambda_7$, $\lambda_8$, a third of said transformed beams containing parallel polarized light at wavelengths $\lambda_1$, $\lambda_2$ and perpendicular polarized light at wavelengths $\lambda_3$, $\lambda_4$, and a fourth of said transformed beams containing perpendicular polarized light at wavelengths $\lambda_1$, $\lambda_2$ and parallel polarized light at wavelengths $\lambda_3$, $\lambda_4$, all four transformed beams being applied to said output polarizing beam splitter means of said second stage, whereby said output polarizer beam splitter means of said second stage yields a first intermediary beam containing wavelengths $\lambda_7$, $\lambda_8$, a second intermediary beam containing wavelengths $\lambda_5$, $\lambda_6$, a third intermediary beam containing wavelengths $\lambda_3$, $\lambda_4$, and a fourth intermediary beam containing wavelengths $\lambda_1$, $\lambda_2$, said four intermediary beams being directed to said input beam splitting means of a third of said stages, to produce, at said input face of said birefringent material of said third stage,
    eight parallel beams of polarized light, a first of said eight parallel beams containing parallel polarized light having wavelengths at $\lambda_7$, $\lambda_8$, a second of said eight parallel beams containing parallel polarized light having wavelengtns at $\lambda_5$, $\lambda_6$, a third of said eight parallel beams containing parallel polarized light having wavelengths at $\lambda_3$, $\lambda_4$, a fourth of said eight parallel beams containing parallel polarized light having wavelengths at $\lambda_1$, $\lambda_2$, a fifth of said eight parallel beams containing perpendicular polarized light having wavelengths at $\lambda_7$, $\lambda_8$, a sixth of said eight parallel beams containing perpendicular polarized light having wavelengths at $\lambda_5$, $\lambda_6$, a seventh of said eight parallel beams containing perpendicular polarized light having wavelengths at $\lambda_3$, $\lambda_4$, and an eighth of said eight parallel beams containing perpendicular polarized light having wavelengths at $\lambda_1$, $\lambda_2$, all said eight parallel beams being spaced apart parallel to each other, being applied to said input face of said birefringent material of said third stage, said eight parallel beams traveling said length of said birefringent material of said third stage to yield an octet of converted beams, one of said converted beams containing parallel polarized light at wavelength $\lambda_7$ and perpendicular polarized light at wavelength $\lambda_8$, a second of said converted beams containing parallel polarized light at wavelength $\lambda_5$ and perpendicular polarized light at wavelength $\lambda_6$, a third of said converted beams containing parallel polarized light at wavelength $\lambda_3$ and perpendicular polarized light at wavelength $\lambda_4$, a fourth of said converted beams containing parallel polarized light at wavelength $\lambda_1$ and perpendicular polarized light at wavelength $\lambda_2$, a fifth of said converted beams containing perpendicular polarized light at wavelength $\lambda_7$ and parallel polarized light at wavelength $\lambda_8$, a sixth of said converted beams containing perpendicular polarized light at wavelength $\lambda_5$ and parallel polarized light at wavelength $\lambda_6$, a seventh of said converted beams containing perpendicular polarized light at wavelength $\lambda_3$ and parallel polarized light at wavelength $\lambda_4$, and an eighth of said converted beams containing perpendicular polarized light at wavelength $\lambda_1$, and parallel polarized light at wavelength $\lambda_2$, all eight converted beams being applied to said output polarizing beam splitter means of said third stage, whereby said output polarizing beam splitter means of said third stage yields a first demultiplexed beam at wavelength $\lambda_8$, a second demultiplexed beam at wavelength $\lambda_6$, a third demultiplexed beam at wavelength $\lambda_4$, a fourth demultiplexed beam at wavelength $\lambda_2$, a fifth demultiplexed beam at wavelength $\lambda_7$, a sixth demultiplexed beam at wavelength $\lambda_5$, a seventh demultiplexed beam at wavelength $\lambda_3$, and an eighth demultiplexed beam at wavelength $\lambda_1$.

4. Multiple channel birefringent demultiplexing apparatus comprising $\log_2 n$ stages serially coupled together, wherein n represents the number of optical wavelengths capable of being multiplexed and $\log_2 n$ is an integer greater than one, each of said stages comprising an input polarizing beam splitting means for receiving at least one input beam of collimated light whose polarization state is immaterial into twice as many orthogonally polarized output beams, said input and output beams being parallel to each other, a length of birefringent material having an input face and an output face, said faces being parallel, for receiving said output beams normally applied to said input face, said material having a length and transfer function such that certain wavelengths pass therethrough with their polarization unchanged and that remaining wavelengths have their polarization rotated by 90° and an output polarizing beam splitting means coupled to said output face for receiving $2^X$ beams of polarized light therefrom and for converting same to $2^X$ collimated multiplexed beams of light whose polarization is immaterial, and wherein said input polarizing beam splitting means of a subsequent one of said stages is coupled to said output polarizing beam splitter of the immediately preceding one of said stages, and wherein X is a positive integer.

5. The multiplexing apparatus as recited in claim 4 wherein, for the first stage, certain wavelengths are alternate wavelengths; for the second stage, certain wavelengths are adjacent pairs of alternate wavelengths; and for $\log_2 n$ stage, certain wavelengths are lower wavelengths.

6. The multiplexing apparatus as recited in claim 5 wherein n is equal to 8, and $\log_2 n$ is equal to 3.

* * * * *